United States Patent Office 3,003,662
Patented Oct. 10, 1961

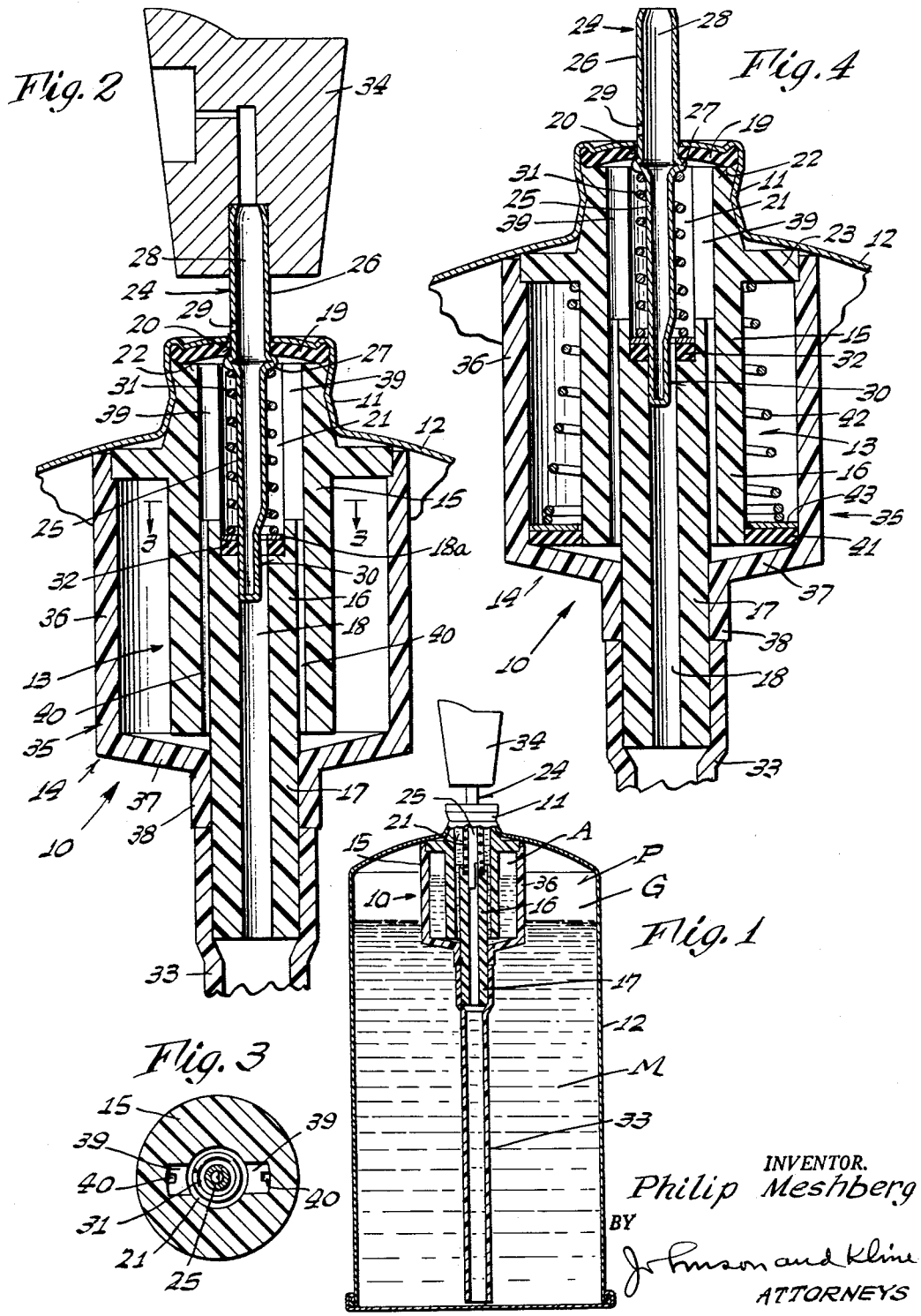

3,003,662
DEVICE AND METHOD FOR DISPENSING MATERIAL UNDER PRESSURE OF AN IMMISCIBLE GAS
Philip Meshberg, 290 Euclid Ave., Fairfield, Conn.
Filed Sept. 14, 1959, Ser. No. 839,899
13 Claims. (Cl. 222—1)

This invention relates to controlling the discharge of materials under pressure of an immiscible gas from a container. More specifically, it pertains to means and a method for dispensing a predetermined quantity of the material upon a single operation of the valve.

Heretofore, metering valves of various types, as shown in Patents Nos. 2,701,163, 2,721,010, 2,723,055 and 2,788,925, have been available for dispensing a measured quantity of material under pressure from a container and have included a valve housing or the like, of predetermined size, which forms the measuring chamber, and means for valving-off the measuring chamber from a container and communicating it with the atmosphere when it is desired to expel the material.

Valves of the type above referred to, while being practical for some purposes, cannot dispense material under pressure of immiscible gas in the container, since there is no means for expelling the material from the valve when the measuring chamber is closed to the container.

The present invention overcomes the problem aforenoted relating to metering type valves, and provides a method and means for dispensing metered quantities of material under pressure of immiscible gas.

According to the invention, the measuring chamber of a typical metering valve is provided with means, which may be in the form of an auxiliary chamber or an integrally formed air pocket, wherein air may be compressed by the pressure of the material entering the chamber, so that when the chamber is closed to the material container and opened to the atmosphere the expansion of the air expels the material from the chamber. The air, which according to the invention is compressed to provide the force for expelling the material from the measuring chamber, is the air at atmospheric pressure that fills the chamber prior to its initial filling from the container or after a charge of material is dispensed. While it will be understood that in many metering valves air is trapped in the measuring chamber when the outlet port is closed or the chamber is valved-off from the atmosphere, the concept of the present invention resides in so compressing the air or pocketing it in relation to the outlet port that when the latter is opened the compressed air expands and drives the material ahead of it from the valve; the air in effect acts as a piston.

A feature of the invention is the utility which is conferred by it on conventional metering valve units of optimum size enabling them to dispense metered amounts of material under the pressure of immiscible gases in addition to the material under pressure of miscible gas for which they were originally designed. In accordance with one form of the invention an auxiliary housing or chamber may be connected to a conventional valve housing and openly communicated with the measuring chamber thereof for supplementing the same and providing an air trap. It is essential to the invention that communication be established in such a manner that the compressed air within the air pocket or auxiliary chamber will expel the material ahead of it from the pocket and the metering chamber when the latter is opened to the atmosphere.

It is an object of the invention to provide a dispensing device adapted to dispense predetermined quantities of material under pressure of an immiscible gas in the container.

Another object of the invention is to provide a dispensing device wherein material is dispensed in predetermined quantities by utilizing the air that is compressed in a measuring chamber, when material is forced therein, to drive the material from the chamber when the latter is communicated with the atmosphere.

It is further an object of the invention to provide a method for dispensing metered quantities of material under pressure of an immiscible gas.

It is still further an object of the invention to provide relatively simple, inexpensive means for modifying a conventionl metering valve unit, whereby its capacity is increased and it is enabled to dispense large quantities of material under pressure of immiscible gas.

Other objects and advantages of the invention will be apparent from the specification and claims when considered in connection with the attached sheet of drawings, illustrating one form of the invention, wherein like characters represent like parts and in which:

FIGURE 1 is an elevational view in section of a dispensing package including a metering valve embodying the concepts of the invention;

FIG. 2 is an enlarged fragmentary elevational view, in section of a dispensing package having a metering valve adapted to dispense predetermined quantities of material under pressure of immiscible gas;

FIG. 3 is a cross-sectional view taken in the direction of the arrows 3—3 in FIG. 2; and FIG. 4 is similar to FIG. 2, but is modified to facilitate dispensing material under constant pressure so that it may be broken down into spray form.

According to the invention, the measuring chamber of a conventional type metering valve, which is of predetermined capacity is provided with means for forming an air pocket, wherein air that is normally at atmospheric pressure may be compressed. While the air pocket or trap may take any convenient form, such as being a separate auxiliary chamber or an integral part of the valve housing etc., it is essential that it be so disposed relative the inlet and outlet means of the chamber that air is compressed into the pocket when material under pressure enters the chamber through the inlet means, and on closing the inlet means and opening the outlet means the air expands from the pocket to drive the material ahead of it from the valve. In accordance with the invention, the measuring chamber, after a charge has been dispensed, is filled with air at atmospheric pressure and when the outlet means is closed to the atmosphere the air is trapped in the chamber. "Air" as used herein means atmospheric air and/or any gaseous fluid as might be found in the measuring chamber after a dispensing operation. Subsequently, the chamber is communicated with a closed container having a material under pressure of an immiscible gas therein and the material is forced into the chamber so that the air therein is compressed into the air pocket and the material substantially fills the chamber. It should at this point be understood that the air is compressed to such a degree that its pressure substantially equals the pressure in the container. Thereafter, when it is desired to dispense a measured quantity of material, the chamber is closed to the container to positively define the amount of material to be dispensed and is then opened or communicated to the atmosphere. When the chamber is opened to the atmosphere, the air that has been compressed in the air pocket expands or returns to atmospheric pressure and forces the material ahead of it out of the valve through the outlet means.

Referring now to the drawings, and FIGS. 1 to 3 in particular, one form of metering valve unit embodying the invention and generally indicated by the numeral 10, is shown mounted in the neck 11 of container 12.

The valve unit 10, which in the illustrated form of the invention comprises a basic or conventional valve unit 13 and an auxiliary unit 14, is adapted to deliver upon the operation of the valve, a measured quantity of material M under pressure of an immiscible gas G from the container. While the invention may be embodied with metering valves of the types shown in the aforenoted patents, it is herein illustrated with a valve of the type shown in my patent No. 2,721,010, wherein the basic valve unit 13 comprises a tubular valve housing 15 having a transverse wall 16 in the inner end thereof formed with a neck 17 and provided with a central aperture 18. The aperture 18 in wall 16 is counterbored as at 18a. A resilient valve disk 19 having a bore 20 therethrough is mounted in the other end of housing 15 and forms the outer end thereof. The area defined between transverse wall 16 and resilient valve disk 19 forms a measuring chamber 21 of predetermined size. The housing 15 forms at its outer end a slightly cup-shaped seat 22 on which is supported the resilient valve disk 19. A rim 23 is formed integral with the tubular wall of valve housing 15 intermediate its length for a purpose to be hereinafter explained. The portion of the tubular wall of valve housing 15 between rim 23 and seat 22 is crimped into the neck 11 of container 12 for mounting the valve unit thereon.

A valve stem 24, which includes an integral inner stem portion 25 and outer stem portion 26, separated by a shoulder or seal 27, is mounted in valve housing 15 with the outer stem portion extending through bore 20 in valve disk 19 and projecting beyond the container. The outer portion 26 of the valve stem is provided with a longitudinal passage 28 which communicates with a lateral passage 29 disposed adjacent the outer face of valve disk 19. The inner portion 25 of valve stem 24 extends into aperture 18 in transverse wall 16 and is formed with a flat 30 at the end thereof which is normally disposed within the aperture. Resilient means in the form of a coil spring 31 or the like biases valve stem 24 upwardly in its outwardly projecting or inoperative position, thereby forcing shoulder 27 into engagement with the inner face of valve disk 19 to seal the housing from the atmosphere. In the inoperative position of valve stem 24 communication is established between measuring chamber 21 of housing 15 and the interior of container 12 through aperture 18 between the wall thereof and the flat 30 of inner valve stem portion 25. The inner end of coil spring 31 engages a washer supported seal 32 and presses the same into counterbore 18a in transverse wall 16 for sealingly defining the aperture 18. In accordance with conventional practice, a dip tube 33 is connected to neck 17 of valve housing 15 and extends into the bottom of container 12 to facilitate the flow of material M into measuring chamber 21.

In the usual operation of basic valve unit 13, as will be readily understood by those conversant with the dispensing art, material under pressure of miscible gas, such as Freon, enters measuring chamber 21 through dip tube 33, neck 17 and aperture 18 around the flat 30 of inner valve stem portion 25. When it is desired to thereafter dispense the material from the measuring chamber, valve stem 24 is depressed by applying axial pressure thereto through a button or operating member 34 so that the inner valve stem portion 25 is moved into aperture 18 to valve-off measuring chamber 21 from the container, whereby a measured quantity of the material is defined. After measuring chamber 21 has been closed to the interior of container 12, continued depression of the valve stem against spring 31 shifts lateral passage 29 into the measuring chamber thereby communicating the latter with the atmosphere through longitudinal passage 28. When the material in the measuring chamber has been dispensed by the expansion of the miscible gas, the pressure on the valve stem is released and the stem is returned to its starting or normal position by the spring 31.

Prior to the present invention metering valves similar to basic valve unit 13 have not been able to dispense materials under pressure of immiscible gases. When an immiscible gas, such as nitrogen, is utilized to dispense a material M, the gas remains separate from the material and forms a gas head P which acts as a piston on the material M to force it up the tip tube 33 and into the measuring chamber 21. After the measuring chamber has been valved-off from the interior of the container by depressing the valve stem 24 the inert material is trapped in the measuring chamber 21, having no means for expelling itself therefrom when the chamber is communicated to the atmosphere upon the continued depression of the valve stem.

In order to provide dispensing means adapted to dispense material under pressure of immiscible gases, the present invention provides means wherein air is trapped by the measured material in a chamber and compressed thereby so that it will act as a piston on the material in the chamber to dispense it therefrom when the chamber is closed to the container and opened to the atmosphere.

In the form of the invention illustrated, an auxiliary unit 14 comprising an auxiliary chamber 35 supplements the measuring chamber 21 and is openly connected and communicated therewith. The auxiliary chamber, which is connected to the valve housing 15 of the basic valve unit, communicates with the measuring chamber in such a manner that the air at atmospheric pressure in the measuring chamber is forced into the auxiliary chamber and compressed by the material flowing into the measuring chamber and the auxiliary chamber and thereafter will expand from the auxiliary chamber to drive the material therefrom and from the measuring chamber when the latter is communicated with the atmosphere.

As illustrated most clearly in FIG. 2, the auxiliary chamber 35 comprises a tubular body member 36 having a substantially transverse bottom wall 37 provided with an outwardly extended open neck 38. The auxiliary chamber is disposed concentrically around valve housing 15 with its bottom wall 37 adjacent and substantially parallel transverse wall 16 and is sealingly connected to the housing by a press fit engagement or the like of the open end of the tubular body member 36 with rim 23 of the housing. Neck 38 of the auxiliary chamber sealingly frictionally grips neck 17 of valve housing 15. In order to facilitate the operation of valve unit 10 and to trap the compressed air in accordance with the concepts of the invention, communication is established between the bottom of auxiliary chamber 35 and the bottom of measuring chamber 21. While such communication may be established by boring a hole or the like through the transverse wall 16 of valve housing 15, or in any other manner known to the art, in the illustrated form of the invention, to facilitate the manufacturing of the valve, the valve housing is formed with relatively thick side walls and transverse wall so that passages may be formed therein for providing uninterrupted communication between the interior of the measuring chamber and the auxiliary chamber. As shown in FIG. 2, longitudinally extending grooves 39 are formed in the side walls of measuring chamber 21 and open adjacent bottom wall 37 of the auxiliary chamber through passages 40 formed in the transverse wall 16 of the valve housing.

In the operation of a valve unit 10, according to the invention and as here shown where an auxiliary chamber 35 is connected to a conventional metering valve unit 13, air at atmospheric pressure fills the measuring chamber and the auxiliary chamber prior to the material M from the container being forced therein and after each operation of the valve. When the valve stem 24 is so positioned that the measuring chamber is opened to the interior of container 12, material M under the pressure of an immiscible gas G flows up the dip tube 33 and through aperture 18 to fill the measuring chamber and force the air therein through passages 40 into auxiliary chamber 35. The air is compressed into an air pocket A (see FIG. 1) at the top of auxiliary chamber 35 by the pressure of the material M until the air pressure is substantially equal to the gas pressure within container 12. When it is thereafter desired to dispense the material in a measured amount from the valve, the valve stem is depressed to valve-off container 12 and define a measured quantity of material within chamber 21 and auxiliary chamber 35. Continued depression of the valve stem shifts lateral passage 29 inwardly of measuring chamber 21 communicating that chamber and the auxiliary chamber with the atmosphere. When the chambers are opened to the atmosphere the air compressed in the pocket A at the top of the auxiliary chamber expands from the chamber driving the material ahead of it outwardly of the valve. It will be understood that the trapped or compressed air, which has a pressure substantially equal to the pressure in the container 12, forces the material toward the bottom 37 of the auxiliary chamber and then upwardly through passages 40 into the measuring chamber 21 and thereafter outwardly of housing 15 through lateral passage 29 and longitudinal passage 28. In this manner the contents of valve unit 10 is completed expelled. It will be readily understood that for the proper operation of the instant invention and for the complete dispensing of the material from the valve unit the air trap, or as here illustrated the auxiliary chamber, should be so disposed relative to the measuring chamber and the outlet therefrom that it will always drive all of the material ahead of it in its effort to expand back to its normal volume and pressure. After the material has been dispensed from the valve the air is again at atmospheric pressure and the valve is in condition to have its cycle of operation repeated.

It has been found that the structural concepts of the present invention, in addition to enabling a material under pressure of an immiscible gas to be dispensed in metered quantities, facilitates dispensing large measured quantities of material under pressure of miscible gas. The vapor block, which has heretofore formed at the top of the measuring chamber, when the latter is initially communicated with the atmosphere and a large quantity of material is to be dispensed, is formed in the air trap so that it is unable to escape from the valve without driving the material ahead of it therefrom.

While the invention has been described in the form of a metering valve having an auxiliary chamber or air trap connected thereto, it should be understood that the concepts of the invention readily embrace a structure wherein the air pocket or trap is formed as an integral part of a valve housing or measuring chamber.

In FIG. 4 a modified form of the invention is shown, which is adapted to facilitate dispensing the material under a more constant pressure than would be achieved by utilizing the pressure of the compressed air alone, thereby enabling the material to be forced through a conventional mechanical break-up device (not shown) for forming a spray thereof. In order to provide a more constant pressure on the material being dispensed, the auxiliary chamber 35 is provided with mechanical means for cooperating with the expanding air to drive the material from the valve unit 10 when the valve is operated. In the form of the invention shown in FIG. 4 an annular seal 41 is slidably sealingly positioned within auxiliary chamber 35 around valve housing 15 and is resiliently biased toward the bottom 37 of the auxiliary chamber by a coil spring 42 or the like. An annular washer 43 may be positioned between annular seal 41 and the end of spring 42 for rigidly supporting the seal and providing a bearing surface for the spring.

In the operation of the modified form of the invention of FIG. 4, the material M is forced into the measuring chamber 21 and auxiliary chamber 35 to compress the air into the air pocket A in the same manner as was explained with respect to the form of the invention shown in FIG. 2. As the material is forced into the valve by the pressure in container 12 and the air is compressed or trapped in the auxiliary chamber the resilient seal 41 is forced upwardly in the chamber against spring 42 until the auxiliary chamber and the measuring chamber are filled. Thereafter, when the valve stem 24 is operated to valve-off container 12 and communicate the measuring chamber and auxiliary chamber with the atmosphere, the pressure within the measuring chamber and auxiliary chamber is relieved enabling the air, as afore-described, to expand and the spring to force the annular seal 41 downwardly in the auxiliary chamber 35 to cooperate with the expanding air in driving the material from the valve. The constant pressure applied to the material by the spring 42 acting through seal 41 provides sufficient force to drive the material through any mechanical break-up device known to the art so that the material is dispensed in a more uniform condition.

Thus, among others, the several objects and advantages of the invention as afore-noted are achieved. Obviously numerous changes in the structure and method may be resorted to without departing from the spirit of the invention as defined by the claims.

I claim:

1. A method for dispensing a predetermined measured quantity of material from a container under pressure of an immiscible gas comprising providing a measuring chamber of predetermined capacity having inlet and outlet means and means for forming an air pocket, said air pocket means including an auxiliary chamber adapted to supplement said measuring chamber and being openly communicated therewith at the opposite side of said chamber from said outlet means, trapping air at atmospheric pressure in the measuring chamber and auxiliary chamber, forcing material from the container by the pressure of the immiscible gas therein through said inlet means into the measuring chamber and auxiliary chamber to compress the air into the latter so that the pressure in the chambers and the container are substantially equal, closing the inlet means so that a predetermined quantity of material is trapped in the chambers and thereafter opening the outlet means for communicating the chambers with the atmosphere so that the trapped air is enabled to expand from the auxiliary chamber and drive the material therefrom and from the measuring chamber.

2. In a dispensing device for controlling the discharge of a measured amount of material from a container under pressure of an immiscible gas including a valve housing providing a measuring chamber having inlet and outlet means therein, and valving means for closing said inlet means to retain a measured quantity of material in said chamber and thereafter opening said outlet means communicating said chamber with the atmosphere; the improvement wherein said measuring chamber is provided with means forming an air trap and located on the side of the measured quantity of material opposite the outlet means and adapted to having air compressed therein when said inlet means is open and material is forced into said chamber under the pressure of the immiscible gas in said container, the compressed air, upon said inlet means being closed and said outlet means opened, expanding from said trap to force all of the material from the measuring chamber.

3. In a dispensing device for controlling the discharge of a measured amount of material from a container under pressure of an immiscible gas including a valve housing providing a measuring chamber having inlet and outlet means therein, and valving means for closing said inlet means to retain a measured quantity of material in said chamber and thereafter opening said outlet means communicating said chamber with the atmosphere; the improvement wherein said measuring chamber is normally at atmospheric pressure and is operably connected with an air trap located with respect to the inlet and outlet means as to have air compressed therein when said inlet means is open and material is forced into said chamber under the pressure of the immiscible gas in said container the compressed air in the air trap, upon said inlet means being closed and said outlet means opened, expanding from said trap to force all of the material from the measuring chamber.

4. In a dispensing device for controlling the discharge of a measured amount of material from a container under pressure of an imiscible gas including a valve housing providing a measuring chamber having inlet means therein, and valving means for closing said inlet means to retain a measured quantity of material in said chamber and thereafter communicating said chamber with the atmosphere; the improvement comprising means forming an auxiliary trap chamber connected to said housing for supplementing said measuring chamber and into which air is compressed by the measured quantity under pressure of said immiscible gas when the inlet means is open, means communicating the auxiliary trap chamber with the measuring chamber, and means including the compressed gas in said auxiliary trap chamber for expelling the material therefrom and from said measuring chamber.

5. In a dispensing device for controlling the discharge of a measured amount of material from a container under pressure including a valve housing providing a measuring chamber having inlet means therein, and valving means for closing said inlet means to retain a measured quantity of material in said chamber and thereafter communicating said chamber with the atmosphere; the improvement comprising an auxiliary chamber disposed around and connected to said housing and forming a supplement to said measuring chamber and an air trap in which air is compressed by the measured quantity under pressure of said immiscible gas, said housing being formed with means adjacent the bottom of the auxiliary chamber for openly communicating the measuring chamber therewith and means in said auxiliary chamber for expelling the material therefrom and from said measuring chamber.

6. In a dispensing device for controlling the discharge of a large measured amount of material from a container under pressure including a tubular valve housing having a transverse wall at an inner end thereof providing a measuring chamber, said housing having inlet means therein, and valving means for closing said inlet means to retain a measured quantity of material in said chamber and thereafter communicating said chamber with the atmosphere; the improvement comprising an auxiliary chamber sealingly disposed concentrically around said housing for supplementing the same and forming an air trap in which air is compressed by the measured quantity under pressure of said immiscible gas, said auxiliary chamber having a bottom wall adjacent and substantially parallel said transverse wall of said housing, said transverse wall being formed with means openly communicating the auxiliary chamber with the interior of said housing and means in said auxiliary chamber for expelling the material therefrom and from said measuring chamber.

7. A dispensing device for controlling the discharge of a large measured amount of material under pressure from a container comprising a tubular valve housing having a transverse wall in the inner end thereof provided with a central aperture defined by an integral axially extending mounting neck portion and a resilient valve disk having a bore mounted in the other end, said housing forming a measuring chamber communicating with said container through said aperture, an auxiliary chamber forming an air trap disposed concentrically around said housing and having a bottom wall provided with an aperture adjacent and substantially parallel to said transverse wall of said housing, said bottom wall aperture frictionally, sealingly engaging said mounting neck portion, said transverse wall being formed with a bore openly communicating the interior of said measuring chamber with said auxiliary chamber whereby the former is supplemented by the latter, means mounting said housing on a container, a valve stem mounted in said housing and having a portion extending through said bore in the valve disk and projecting beyond the container, said stem having a longitudinal passage in the projecting portion communicating with a lateral passage disposed adjacent the outer face of the valve disk, resilient means urging the stem into projecting position with the lateral passage adjacent the outer face of the disk, movement of said stem against the urging means a predetermined distance from normal projecting position causing said stem to close said aperture in said transverse wall so that communication is broken with said container and thereafter causing said lateral passage to be moved into communication with the measuring chamber so that said measuring chamber and auxiliary chamber are communicated with the atmosphere and means in said air trap for expelling the material therefrom and from said measuring chamber.

8. In a dispensing device for controlling the discharge of a large measured amount of material from a container under pressure including a valve housing providing a measuring chamber having inlet means therein, and valving means for closing said inlet means to retain a measured quantity of material in said chamber and thereafter communicating said chamber with the atmosphere; the improvement comprising an auxiliary air trap chamber connected to said housing for supplementing the measuring chamber, means communicating the auxiliary chamber with the measuring chamber through the bottom of said housing, means in said auxiliary chamber for expelling the material therefrom and from said measuring chamber and mechanical means in said auxiliary chamber cooperating with said expelling means for assisting in expelling all of said material from said auxiliary chamber and said measuring chamber at a constant pressure.

9. In a dispensing device for controlling the discharge of a measured amount of material from a container under pressure of an immiscible gas including a valve housing providing a measuring chamber having inlet means therein, and valving means for closing said inlet means to retain a measured quantity of material in said chamber and thereafter communicating said chamber with the atmosphere; the improvement comprising an auxiliary trap chamber connected to said housing and forming a supplement to said measuring chamber, said housing being formed with means adjacent the bottom thereof for openly communicating the measuring chamber with the auxiliary chamber, means in said auxiliary chamber for expelling the material therefrom and from said measuring chamber and mechanical means cooperating with and assisting said expelling means for applying a constant pressure to said material, said mechanical means including a sealing member slidably movable within said auxiliary chamber for decreasing the volume thereof and resilient means for normally biasing said sealing member toward the bottom of said housing.

10. A dispensing device for controlling the discharge of a large measured amount of material under pressure from a container comprising a tubular valve housing having a transverse wall in the inner end thereof provided with a central aperture defined by an integral axially extending mounting neck portion and a resilient valve disk having a bore mounted in the other end, said housing forming a measuring chamber communicating with said container through said aperture, an auxiliary trap chamber disposed concentrically around said housing and having a bottom wall provided with an aperture adjacent and substantially parallel to said transverse wall of said housing, said bottom wall aperture frictionally, sealingly engaging said mounting neck portion, said transverse wall being formed with a bore openly communicating the interior of said measuring chamber with said auxiliary chamber whereby the former is supplemented by the latter, means mounting said housing on a container, a valve stem mounted in said housing and having a portion extending through said bore in the valve disk and projecting beyond the container, said stem having a longitudinal passage in the projecting portion communicating with a lateral passage disposed adjacent the outer face of the valve disk, resilient means urging the stem into projecting position with the lateral passage adjacent the outer face of the disk, movement of said stem against the urging means a predetermined distance from normal projecting position causing said stem to close said aperture in said transverse wall so that communication is broken with said container and thereafter causing said lateral passage to be moved into communication with the measuring chamber, means in said auxiliary chamber for expelling said material therefrom and from said measuring chamber to the atmosphere and mechanical means cooperating with and assisting said expelling means for applying a constant pressure to said material, said mechanical means including an annular seal slidably sealingly engaging the outer surface of said housing and the inner surface of said auxiliary chamber and resilient means for normally biasing said seal toward the bottom wall of the latter.

11. In combination with a container having a material under pressure of an immiscible gas therein; a dispensing device for controlling the discharge of a measured amount of said material under said pressure comprising a valve housing sealingly connected to said container and providing a measuring chamber, said housing having inlet and outlet means communicating said chamber with the interior of said container and with the atmosphere respectively, said chamber having air at atmospheric pressure therein when said inlet means is closed and said outlet means is open, valving means for closing said outlet means and opening said inlet means so that said chamber is communicated with the interior of said container to receive said material therefrom under pressure of said immiscible gas and means forming a pocket operably associated with said measuring chamber wherein the air is compressed by the material entering said chamber when said inlet means is open, said pocket being located on the opposite side of said measured amount of material from said outlet means that on said inlet means being closed and said outlet means opened, the compressed air trapped in said pocket expands to drive all of the material ahead of it from the chamber.

12. A method for dispensing from a container a predetermined measured quantity of material, said container being under pressure of a propellant immiscible gas; comprising trapping air at atmospheric pressure in a measuring chamber, forcing material from the container into the measuring chamber under pressure of the immiscible gas to compress the trapped air so that the pressure of the trapped air in the chamber and the pressure in the container are substantially equal, closing-off communication between the container having the propellant and the chamber so that a predetermined quantity of material is trapped in the latter between the compressed air and a means for communicating the chamber with the atmosphere, and thereafter communicating the measuring chamber with the atmosphere so that the compressed trapped air can expand and provide the force to drive the material ahead of it and expell the material from the chamber.

13. A method for dispensing from a container a predetermined measured quantity of material, said container being under pressure of a propellant immiscible gas; comprising trapping air at atmospheric pressure in a measuring chamber having inlet and outlet means, forcing material from the container through the inlet means into the measuring chamber under pressure of the immiscible gas to compressed the trapped air into an air pocket communicating with the measuring chamber so that the pressure of the trapped air in the air pocket and the propellant in the container are substantially equal with a predetermined quantity of material being trapped in-between the compressed air and the outlet means, closing the inlet means to prevent the propellant from acting on the material in the measuring chamber, and thereafter opening the outlet means to the atmosphere so that the compressed trapped air can expand and provide the force to drive the material ahead of it from the chamber.

References Cited in the file of this patent

UNITED STATES PATENTS

| | | |
|---|---|---|
| 1,870,188 | Abrams | Aug. 2, 1932 |
| 2,781,954 | Bretz | Feb. 19, 1957 |
| 2,812,884 | Ward | Nov. 12, 1957 |